(12) United States Patent
Li et al.

(10) Patent No.: US 9,639,543 B2
(45) Date of Patent: May 2, 2017

(54) ADAPTIVE INDEX FOR DATA DEDUPLICATION

(75) Inventors: Jin Li, Bellevue, WA (US); Sudipta Sengupta, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 425 days.

(21) Appl. No.: 12/979,681

(22) Filed: Dec. 28, 2010

(65) Prior Publication Data

US 2012/0166448 A1 Jun. 28, 2012

(51) Int. Cl.
*G06F 17/30* (2006.01)

(52) U.S. Cl.
CPC .... *G06F 17/30097* (2013.01); *G06F 17/3007* (2013.01); *G06F 17/30159* (2013.01)

(58) Field of Classification Search
CPC ................................................. G06F 17/30159
USPC ........................................................ 707/664
See application file for complete search history.

(56) References Cited

U.S. PATENT DOCUMENTS

| | | | | |
|---|---|---|---|---|
| 7,640,262 | B1 * | 12/2009 | Beaverson | G06F 17/30327 |
| 8,370,309 | B1 * | 2/2013 | Ramarao et al. | 707/664 |
| 2003/0182310 | A1 * | 9/2003 | Charnock et al. | 707/104.1 |
| 2003/0195869 | A1 * | 10/2003 | Bhattacharjee | G06F 17/30321 |
| 2008/0098083 | A1 | 4/2008 | Shergill et al. | |
| 2008/0133561 | A1 * | 6/2008 | Dubnicki et al. | 707/101 |
| 2008/0243992 | A1 * | 10/2008 | Jardetzky et al. | 709/203 |
| 2009/0254609 | A1 | 10/2009 | Wideman | |
| 2009/0268903 | A1 * | 10/2009 | Bojinov et al. | 380/45 |
| 2011/0125719 | A1 * | 5/2011 | Jayaraman | 707/692 |
| 2011/0307683 | A1 * | 12/2011 | Spackman | 711/216 |
| 2012/0030477 | A1 * | 2/2012 | Lu et al. | 713/189 |
| 2012/0124282 | A1 * | 5/2012 | Frank et al. | 711/108 |
| 2012/0150823 | A1 * | 6/2012 | Tofano | 707/692 |

FOREIGN PATENT DOCUMENTS

| | | |
|---|---|---|
| CN | 101595459 A | 12/2009 |
| CN | 101916171 A | 12/2010 |

OTHER PUBLICATIONS

"Office Action and Search Report Received for Chinese Patent Application No. 201110448888.1", Mailed Date: Jan. 6, 2014, 10 Pages.

"Office Action and Search Report Received for Chinese Patent Application No. 201110448888.1", Mailed Date: Aug. 4, 2014, 14 Pages.

* cited by examiner

*Primary Examiner* — Grace Park

(57) ABSTRACT

The subject disclosure is directed towards a data deduplication technology in which a hash index service's index and/or indexing operations are adaptable to balance deduplication performance savings, throughput and resource consumption. The indexing service may employ hierarchical chunking using different levels of granularity corresponding to chunk size, a sampled compact index table that contains compact signatures for less than all of the hash index's (or subspace's) hash values, and/or selective subspace indexing based on similarity of a subspace's data to another subspace's data and/or to incoming data chunks.

20 Claims, 6 Drawing Sheets

ADAPTIVE INDEX FOR DATA DEDUPLICATION

CROSS-REFERENCE TO RELATED APPLICATIONS

The present application is related to copending U.S. patent applications entitled "Fast and Low-RAM-Footprint Indexing for Data Deduplication" (U.S. patent application Ser. Nos. 12/979,644 and 12/979,669), and "Using Index Partitioning and Reconciliation for Data Deduplication" (U.S. patent application Ser. No. 12/979,748), filed concurrently herewith and hereby incorporated by reference.

BACKGROUND

Data deduplication (sometimes referred to as data optimization) refers to reducing the physical amount of bytes of data that need to be stored on disk or transmitted across a network, without compromising the fidelity or integrity of the original data. By reducing the resources needed to store and/or transmit data, data deduplication thus leads to savings in hardware costs (for storage and network transmission) and data-managements costs (e.g., backup). As the amount of digitally stored data grows, these cost savings become significant.

Data deduplication typically uses a combination of techniques for eliminating redundancy within and between persistently stored files. One technique operates to identify identical regions of data in one or multiple files, and physically storing only one unique region (chunk), while maintaining a pointer to that chunk in association with the file. Another technique is to mix data deduplication with compression, e.g., by storing compressed chunks.

In order to identify the chunks, the server that stores the chunks maintains a hash index service for the hashes of the chunks in the system. The hash does not have locality, i.e., chunk hashes for chunks in the same file are unrelated, and any edits to a given chunk's content create a very different (unrelated) hash value. Thus, traditional database technology, such as B-tree indexing, leads to poor performance in index serving. Maintaining the entire index in memory provides good performance, but consumes too many resources. The server memory resource is needed by other server applications, (e.g., in primary data deduplication scenarios), and for caching.

Prior backup-oriented data deduplication optimization has relied upon a look-ahead cache to reduce the amount of resources used in accessing the index on the server. However, data deduplication is no longer limited to data backup scenarios, and is moving towards being used as a primary data storage cluster accessed like any other storage device. The use of a look-ahead cache alone to reduce the resource usage is not an adequate solution.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a deduplication technology by which the hash index service adapts its indexes and/or indexing operations to balance between deduplication performance savings, throughput and resource consumption. In one aspect, a level of granularity (e.g., corresponding to chunk size) is selected to use in indexing one or more chunks of a deduplicated file. The determination of whether a chunk exists, or does not exist and needs to be stored and indexed, is performed at that level of granularity. For each chunk hash at the selected granularity level, a determination is made as to whether that chunk hash is already indexed or is a non-indexed chunk hash. The level of granularity may be selected per subspace (corresponding to a divided subset of the hash index). The chunks may be re-indexed at a different level of granularity, such as in an offline process that runs after running the online deduplication process. The selected level of granularity may be dynamic, such as adjusted when resource availability changes, or when processing the chunks of a file during deduplication indexing operations.

In one aspect, a sampled compact index table may be built that includes compact signatures representative of some of the hash values of the hash index, in which the sampled compact index table contains less entries than the hash index based upon a sampling factor. The hash index service accesses the sampled compact index table when attempting to determine whether a given hash value is indexed in the hash index. The sampled compact index table may be per subspace, and may have its entries based upon spatial positions in the hash index that correspond to the sample factor (e.g., every fourth position), or based upon the entries' values.

The sampled compact index table may be used in conjunction with a look-ahead cache. When the hash index service accesses the sampled compact index table to determine a location of a hash value in the hash index, the hash index service also obtains one or more neighbor hash index, metadata entries when accessing the hash index. These are added to the look-ahead cache for subsequent lookups.

In another aspect, a signature may be computed for a subspace based upon at least some of the data corresponding to that subspace. The signature may be used to determine whether to use a subspace index corresponding to that subspace during a deduplication process. The signature may be compared with the signature of another subspace to determine its similarity, and/or may be used with a signature computed from incoming data chunks.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
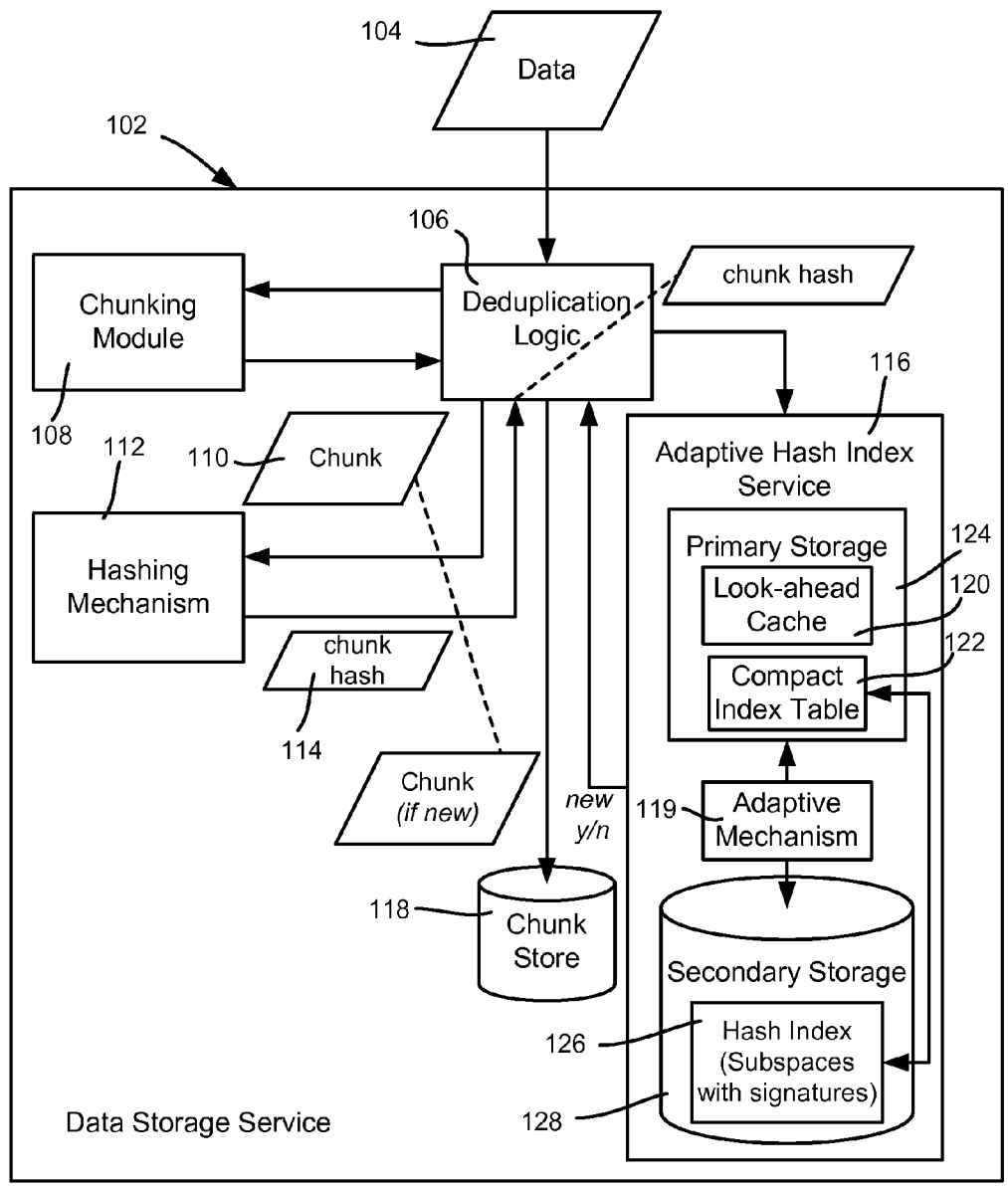
FIG. 1 is a block diagram representing example components of a data storage service configured for deduplication using an adaptive hash index service.

Various aspects of the technology described herein are generally directed towards a hash indexing service of a deduplication system that operates adaptively to balance between the deduplication saving and resource consumption. For example, the hash indexing service may have a global index in secondary storage (e.g., a hard disk drive or solid-state drive) partitioned into sub-indexes, referred to as subspace indexes; by selectively sampling based on subspace-related criteria, only certain "sampled" subspace indexes are loaded into memory, thereby saving RAM at the cost of reduced data deduplication performance because of occasionally not detecting an already indexed and stored chunk, (meaning that the chunk will be stored and indexed more that once).

As another type of adaptation, the global hash store in the secondary storage device can be hierarchically sampled, such as by maintaining multiple levels of hashes for a subspace, e.g., at the file level, or using one (e.g., 64 KB) average chunk size, and/or using another, smaller (e.g., 8 KB) average chunk size. Then, depending upon one or more criteria associated with the data, e.g., file type, file usage pattern, user types and/or other criteria, the hash index service may select an appropriate level to use for each subspace.

Still further, a hash index in secondary storage may have its hashes located via a compact index table, containing a small (e.g., 2-byte) compact signature representative of a full hash value, and a (e.g., 4-byte) pointer to the hash index in secondary storage where that full hash value is located. To improve the fill ratio of the compact index table, an efficient strategy is the use of cuckoo hashing, i.e., to assign any one of up to n entries of the compact index table to each hash value, where the locations of the n entries are determined by the entry itself (e.g., n hashes). The compact signature identifies whether the hash value is stored in a particular entry. Only when the compact signature matches the signature of the hash value at that location, is the pointer to the hash index in secondary storage checked to see if the full hash value in the pointer location is indeed the hash value being processed. This compact index table may be associated with a subspace, and can be sub-sampled. For example, during the creation of the compact index table for the subspace, the hash index service may choose to only load a fraction of hash entries into the compact index table, while leaving the rest of the entries in the secondary storage device. Depending on the current system workload and resource availability, the hash index service may adapt the sampling to be used for the compact index table, thereby balancing between CPU/memory resource consumption and data deduplication performance.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in data processing, data indexing and data deduplication in general.

FIG. 1 shows example components of a content-aware data deduplication data storage system, such as implemented in a data/file storage service 102. The service 102 receives data 104 (a file, blob, or the like), and deduplication logic 106 processes the data for deduplication. To this end, the deduplication logic 106 provides the data 104 to a chunking module 108, which processes the content into chunks, such as according to the structure of the file (e.g., partition a media file into a media header and media body), or by using a quick calculable weak hash function (e.g., Rabin hash) that is computed at every small interval (usually for each byte). A chunk boundary is generally determined in a data-dependent fashion at positions for which the hash function satisfies a certain condition. The following description is with respect to one chunk 110, although it is understood that the data is typically partitioned into multiple chunks.

The deduplication logic 106 passes the chunk 110 to a hashing mechanism 112, which computes a hash of the chunk, referred to as the chunk hash 114. A strong hash function, e.g., a cryptographically secure SHA-256 hash function or the like may be used as the chunk hash 114 that uniquely identifies the chunk 110. Note that with such a secure hash, the probability of a hash collision is negligible, e.g., a hash collision is around thirty orders of magnitude less likely than a hardware error given the most reliable hardware currently available.

The chunk hash 114 is provided to a hash index service 116 (which includes or is coupled to a reconciliation mechanism 117). If the chunk hash 114 is found (that is, already exists) in the hash index service 116, a duplicated copy of the chunk 110 is considered to have been already deposited in the chunk store 118, and the current chunk need not to be further stored. Instead, any reference to this chunk may simply refer to the prior, existing chunk.

If the chunk hash 114 is not found in the hash index service 116, the chunk 110 is deposited into the chunk store 118, and the chunk hash 114 is deposited into the hash index service 116. As can be readily appreciated, given enough data over time, a great deal of storage may be saved by referencing a chunk instead of maintaining many separate instances of the same chunk of data. Chunks are often also compressed, saving even more storage.

The technology described herein is directed towards the architecture and algorithm of the hash index service 116, and more particularly towards a hash index service that uses an adaptive mechanism 119 that controls various aspects of indexing, generally to tradeoff resource usage versus deduplication performance, such as when resources (especially primary storage space) is scarce as described below.

The technology described herein is directed towards an architecture and adaptive algorithms of the hash index service 116, and includes algorithms that deal with a look-ahead cache 120 and compact index table 122 in a primary storage 124, and a hash index 126 in a secondary storage 128. Note that the hash index 126 may be a single global index, or may be divided into multiple indexes, such as in a subspace-based hash index service, where a subspace comprises a smaller subset of the overall global hash index maintained by the hash index service, as described in the aforementioned U.S. patent application entitled "Using Index Partitioning and Reconciliation for Data Deduplication."

In a subspace-based indexing scheme, the hash index service's index 126 is partitioned into subspace indexes, such that less than the entire hash index service's index may be loaded into memory at a time, thereby conserving the available memory. The hash index may be divided into the subspace indexes based on one or more criteria, which may correspond to how the data to be deduplicated is partitioned. Example dividing/partitioning criteria include the data's file type, data type, location, an application that created the data, file usage pattern data, file access pattern data, file owner, file user type, namespace, file content, file metadata, learned criteria or adaptive criteria, or any combination of file type, data type, location, a file-creating application, file usage pattern data, file access pattern data, file owner, file user type, namespace, file content, file metadata, learned criteria or adaptive criteria.

In a hash index service that supports subspace partitioning, different subspaces may contain indexes to content with very different deduplication savings performance, deduplication granularity (basically corresponding to how large chunks are) and chunk access patterns. As described herein, the hash index service may adaptively sample the indexes associated with the subspaces to balance between deduplication performance and resource consumption.

By way of example, for a subspace that is not anticipated to provide much storage saving via deduplication, such as a subspace associated with user-encrypted files, the deduplication service 102/adaptive hash index service 116 may choose not to index that subspace at all. Note that such files may not even be provided to the deduplication service 102 for deduplication, but if they are, the adaptive hash index service 116 can detect them based on various criteria (e.g., including their subspace) and not process them into chunks for deduplication; instead, the indexing may be performed at the file level for the entire file's content, e.g., as one chunk. For example, for a subspace that contains independently encrypted files, e.g., digital rights-managed audio and/or video media files, the file may not be chunked, and the content indexed at the file level. That is, the hash is calculated on the entire encrypted media file, and the encrypted media file deduplicated at the file level, not the chunk level. Note that such an encrypted media file shares the same encryption key across different users, thus the file can still be deduplicated across users in a file storage service. Conversely, if the file is individually encrypted through an individual key of the user, e.g., encrypted content with individual key deposited by the user to a central storage service, the file may not be indexed at all, that is, such a file is not be deduplicable.

Alternatively, the hash index service 116 may calculate a signature of a subspace, such as by selectively indexing a few chunks corresponding to the subspace. The signature of the subspace may be used to identify deduplication opportunities, as described below. Only for subspaces identified as having significant deduplication opportunities is further deduplication processing performed.

Moreover, indexes of the files of a subspace may be calculated at different granularities. A coarser granularity index (indexing the hashes of large chunks) may be chosen first, and only if and when it is identified that finer granular deduplication opportunity is likely to be helpful, will deduplication with finer granularity (indexing the hashes of smaller chunks) be used.

In general, applying a uniform sampling strategy across all subspaces will likely significantly waste primary and secondary storage resources to maintain the index (if a too-fine granular chunking strategy is applied there will be a large quantity of chunks), or will reduce the potential deduplication performance savings (if a too coarse chunking strategy is applied not as many chunks will match others). One strategy to balance between the deduplication saving and the primary and secondary storage resource consumption of the hash index service 116 is to use adaptive sampling as described herein.

As one adaptation, the deduplication service 102/hash index service 116 may choose to use different chunking schemes and different chunking strategies for subspaces with different properties. The deduplication system also may apply a selected chunking strategy based on the file type. For example, for image content (e.g., a JPEG file) and audio content (e.g., a WMA file or MP3 file), the entire file may be chunked into a media header and a media body. For video content (e.g., a WMV file, AVI file, or MPG file), the entire file may be chunked into a media header and multiple streams, with each stream corresponding to a group of pictures in the video file. One reason for this strategy is that in many cases, a user may modify the media metadata, e.g., change information such as the time of creation, artist, and so forth, and truncate uninteresting content away from the media, while it is rare for the media body to be modified. Thus, chunking the media content into a media header and several big chunks tends to maintain as much deduplication saving as possible, while reducing resource consumption for indexing.

In a large data store, it is often observed that a large amount of content is not deduplicated at all. Instead, deduplication saving is mainly obtained from a selected set of files that have many versions, and/or files that are frequently shared between users. Because of this, signature-based adaptive sampling may be used as described below. To this end, the chunking operation and indexing operation may be deferred. Instead, a signature is calculated for each subspace. Then signature of the subspace is used to identify deduplication opportunities. Once a deduplication opportunity has been identified for a particular subspace, the chunking operation and indexing operation are performed.

To calculate the signature of each subspace without sophisticated chunking, a relatively cost-effective chunking solution may be applied. For example, the file header or file metadata in the subspace may be obtained as initial chunks. Then, a set of hashes $h_{j,1}, h_{j,2}, \ldots, h_{j,l}$ is computed on the chunks, e.g., through the use of a SHA-256 hash. After that, (similar to finding subspace indexes to reconcile as described in the aforementioned U.S. patent application entitled "Using Index Partitioning and Reconciliation for Data Deduplication"), signatures of the subspaces may be calculated and used to identify the deduplication potential of the subspace by calculating a resemblance metric $R(P_i, P_j)$ of two subspaces with signatures $P_i$ and $P_j$, where the resemblance metric defines how similar (i.e., deduplicable) two subspaces are.

The signature of the subspace can take various forms. Let subspace $P_j$ comprise a set of hashes $h_{j,1}, h_{j,2}, \ldots, h_{j,l}$. A number of sample signatures of subspaces $P_j$ are:

1. Min hash or its variant (e.g., with a hash value close to a particular constant); max hash is one such variant, for example.

$$Sig_1(P_j) = \min\{h_{j,1}, h_{j,2}, \ldots, h_{j,l}\},$$

2. k-min hash or its variant.

$$Sig_2(P_j) = \text{a set of } k\text{-minimal hash values among } \{h_{j,1}, h_{j,2}, \ldots, h_{j,l}\}$$

Other algorithms that can produce a set of k deterministic hash values from the full hash value set can be used as well, e.g., the signature can be k hash values that are closest to a constant H.

3. Bloom filter
   The signature is a bloom filter formed by the full hash value set $\{h_{j,1}, h_{j,2}, \ldots, h_{j,l}\}$.
4. k-min hash+bloom filter.
   The signature is a bloom filter formed by k-minimal hash values obtained in 2.
5. b-bit minwise hash (as described in P. Li, and A. C. Konig, "b-Bit Minwise Hash", WWW 2010).
   The signature is formed by a b-bit minwise hash over the full hash value set $\{h_{j,1}, h_{j,2}, \ldots, h_{j,l}\}$.
6. k-min hash+b-bit minwise hash.
   The signature is formed by a b-bit minwise hash over k-minimal hash values obtained in 2.

For each signature calculation method, a resemblance metric $R(P_i, P_j)$ is defined, representing how similar (i.e., deduplicable) are two subspaces. In one implementation, the resemblance metric takes a value from 0 to 1. The larger the resemblance value, the more probable that the two subspaces are similar, hence deduplicable. The resemblance metric of each signature may be:

1. Min hash:
   $R(P_i, P_j)=1$, if the min hash of the two subspaces are equal,
   $R(P_i, P_j)=0$, otherwise.
2. K-min hash:
   $R(P_i, P_j)=q/k$, if there are q equal (common) min hashes among subspaces $P_i$, $P_j$.
3. Bloom filter and/or k-min hash+Bloom Filter:

$$R(P_i, P_j) = \frac{|\text{Bloom\_Filter}(P_i) \cap \text{Bloom\_Filter}(P_j)|}{|\text{Bloom\_Filter}(P_i) \cup \text{Bloom\_Filter}(P_j)|}$$

4. b-bit minwise hash and/or k-min hash+b-bit minwise hash (comparison based on algorithm 1 in P. Li, and A. C. Konig, "b-Bit Minwise Hash", WWW 2010).

In this manner, if two subspaces have a large resemblance value, they have significant deduplication opportunities. The chunking operation and indexing operation are performed on such similar subspaces. Further, if corresponding signatures computed on incoming chunks are determined to be similar to a subspace's signature, then the subspace index can be loaded if resources are available (which may possibly replacing another index subspace that is not in active use if insufficient resources are available).

Figure 2:
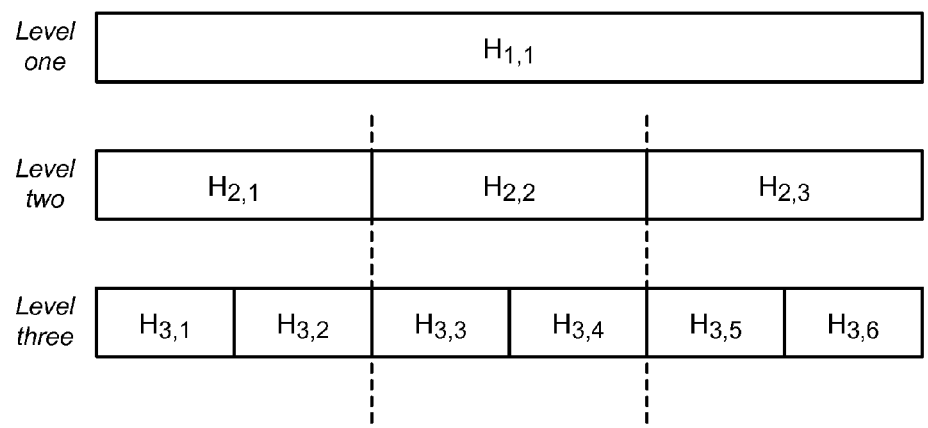
FIG. 2 is a representation of hierarchically-chunked file data with each chunk represented by a hash value.

Turning to an aspect referred to as hierarchical chunking, another strategy to balance the resource consumption of the hash index service 116 and the amount of deduplication savings is the use of hierarchical chunking, as generally represented in Error! Reference source not found. In FIG. 2, the same file is shown as having been chunked with three different levels of granularity. Note that the coarser chunking granularity corresponding to the larger chunks (higher up) in FIG. 2 can be obtained by merging the chunks in the finer, smaller chunking configurations.

For example, in Error! Reference source not found, at granularity level one, there is one chunk for the entire file, that is, deduplication is at the file level. At granularity level two, the file is split into three medium chunks (level two chunks). At granularity level three, each of the level two chunks is further split into two smaller chunks. The large level one chunk is referred to as the parent chunk, and the underlying chunks are referred to as the children chunks.

There is one hash value associated with each of the chunk. Thus for the file represented in FIG. 2, the file is associated with one level one hash value $H_{1,1}$, two level two hash values $H_{2,1}$ and $H_{2,2}$, and six level three hash values $H_{3,1}$ to $H_{3,6}$.

Through the use of hierarchical chunking, the data deduplication service generates multiple chunking granularities with multiple hash values during the chunking stage, whereby the hash index service 116 can choose to load different hierarchical indexes to balance the resource consumption and deduplication savings. Referring to FIG. 2 as an example, the chunking algorithm generated six level three chunks, two level two chunks, and one level one chunk. As such, when the deduplication service 102 is looking to see whether a chunk already exists in the system, the service 102 queries the hash index service 116 with the six level three hash values $H_{3,1}$ to $H_{3,6}$, two level two hash values $H_{2,1}$ and $H_{2,2}$, and one level one hash value $H_{1,1}$.

The hash index service 116 may choose to use a different granularity level of the indexes to adapt to the current memory resource availability, which affects the deduplication savings performance. For example, in a tight memory situation, the hash index service 116 may only maintain the file level hash (level 1) index, whereby only file level deduplication optimization is performed; even a very slightly-modified file relative to the file represented by the hash value $H_{1,1}$ will not have its hash matched with the hash $H_{1,1}$ of the single chunk.

When more memory is available, the hash index service 116 may choose to maintain a medium level hash (level two) index. Thus, the same slightly modified file may have some of its content detected as a duplicate of an existing chunk because more hashes are looked up. For example, hash values $H_{2,1}$ may be matched, whereby the chunks of the file being processed are handled as existing duplicates, with only one new chunk saved because the other chunk may be slightly modified and $H_{2,2}$ was not found.

At the finer level hash (level three), even more chunks' hashes are evaluated to look for existing duplicates, whereby the more refined granularity level offers potentially even more deduplication savings. As can be seen, via adaptive hierarchical chunking deduplication savings performance versus resource consumption can be balanced as needed for a given situation.

One advantage of hierarchical chunking is that it allows the granularity of the chunking to be efficiently adjusted afterwards, so that the deduplication service can use one level of granularity first, and later, when reconciliation is executed, choose to adjust to a different chunking granularity level. Smaller chunks may easily be merged into larger chunks (or a single chunk), and a larger chunk may be split into smaller chunks via appropriate cut point selection.

In hierarchical chunking, it is desirable for consistent cut points to be chosen across multiple hierarchical levels. Note that some chunking algorithms (but not all) that are known for use in declaring chunking cut points may be modified to satisfy this property. For example, a simply Rabin Hash pre-processes the file stream through a hash that summarizes the contents of windows comprising a rolling w bytes (typically w=12 . . . 64) scanned through the file into a single 4-byte value v, which can be computed incrementally. Then a cut point is declared whenever v mod h=0. With hierarchical chunking, the algorithm is modified by setting multiple h values $h_1$, $h_2$, $h_3$, for different hierarchical levels, and making sure that $h_1$ is a multiple of $h_2$, and $h_2$ is a multiple of $h_3$. This guarantees that the cut boundary at coarser hierarchical level is automatically the cut boundary at a finer hierarchical level (as represented by the dashed lines in FIG. 2).

Another commonly used cut point algorithm is to choose the cut-points that are local maxima (or local minima). An h-local maximum is a position whose hash value v is strictly larger than the hash values at the preceding h and following h positions. Mathematics show that the average distance between cut points is 2h+1. With hierarchical chunking, multiple h values $h_1$, $h_2$, $h_3$ may be set for different hierarchical levels, ensuring that $h_1 > h_2 > h_3$. This again guarantees that the cut boundary at coarser hierarchical level is automatically the cut boundary at finer hierarchical level.

The hash index service 116 may adaptively/dynamically adjust the granularity level to balance between the resource utilization and deduplication saving. For example, the service may first use the coarse level chunking. However, when the hash index service 116 observes a number of hash hits, followed by a hash miss, the hash index service 116 may choose to adjust the chunking granularity and use a finer granularity chunking for the rest of the file. A reason for this being advantageous is that the pattern of several consecutive hash hits followed by a hash miss usually indicates a transition region, in which the content of the file may be modified, inserted and/or deleted. Thus, a finer granularity indexing may be warranted in that region to improve the deduplication saving. Likewise, when the hash index service 116 is using finer granularity indexing, if several consecutive hash hits are observed, the consecutive finer granularity chunking can be merged into a coarser granularity, e.g., reverting back to the use of coarse granularity chunking and thereby reducing the memory resource consumption of the hash index service 116.

Another aspect of adaptive hash indexing is directed towards adaptive sampling on the compact index table 122. As described in the aforementioned U.S. patent application entitled "Fast and Low-RAM-Footprint Indexing for Data Deduplication," a strategy to reduce the amount of secondary storage device I/O access (to access the hash index 126) is through the use of a compact index table 122 and/or the use of look-ahead cache 120. As described therein, and as summarized above, the compact index table 122 indicates when a given hash value is not in the hash index (e.g., corresponds to a new chunk), and thus avoids many secondary storage device lookups.

Further, the compact index table 122 provides a pointer that locates (to a high probability) the hash value in the secondary storage hash index 126. Not only is the chunk metadata associated with that hash value returned when found, but neighboring indexes are obtained during the device access, and loaded into a look-ahead cache. More particularly, after an incoming file is chunked and each chunk is hashed, the hash value H of the chunk is queried against the compact index table 122 (assuming the hash was not found in a previous lookup of another cache, as described in that patent application). If one or more matches are found between the compact signatures of the query hash and the compact signatures stored in the compact index table 122, the full hash value associated with the pointer of the match signature entries will be retrieved from the secondary device. If the full hash value matches, a block of neighboring indexes (e.g., those just after) the matching position is loaded into the look-ahead cache. In this way, a looked-up hash value corresponding to a file chunk has subsequently-indexed hash values (corresponding to subsequent chunks) loaded into the primary storage look-ahead cache 120. This caching strategy is generally based on locality, that is, the likelihood that if one chunk of a file matches an existing chunk of an already deduplicated file, the next chunk is likely to match a subsequent chunk in that already deduplicated file.

Instead of having a compact signature for each hash value in the hash index 126, the hash index service 116 can perform sampling when building/maintaining the compact index table 122, thus balancing the amount of memory resource consumption and deduplication savings. For example, only a fraction of the hash values may have a compact signature loaded into the compact index table. To this end, when forming a compact index table of subspace $P_i$, the hash index service 116 may use a spatial sampling factor N, so that 1 of N indexes of subspace $P_i$ is used to form the compact index table $T_i$. It is feasible for the hash index service 116 to maintain multiple sampling factors $N_1$, $N_2$, $N_3$, and so forth, with $N_1 < N_2 < N_3$, which corresponds to compact index tables $T_{i,1}$, $T_{i,2}$, and $T_{i,3}$. Based on the memory resource availability, the hash index service 116 may use a different compact index table. When memory resources are more abundant, the hash index service 116 may use a compact index table $T_{i,1}$ with a lower sampling factor, e.g., one out of two, which leads to better deduplication saving. When memory resources are scarcer, a compact index table $T_{i,3}$ with a higher sampling factor can be used, such as one out of ten, which provides a smaller compact index table but may lead to reduced deduplication savings.

Figure 3:
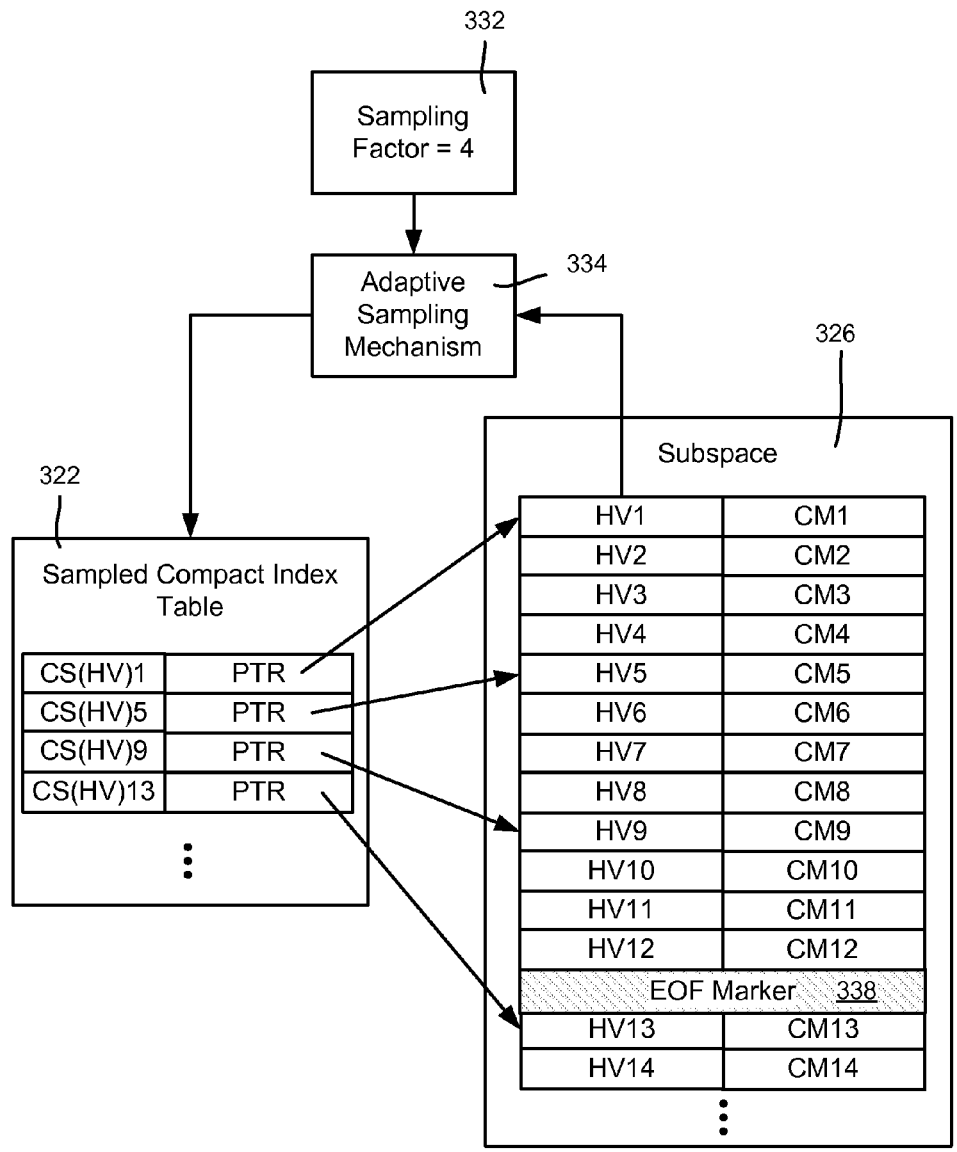
FIG. 3 is a block diagram representing sampling of a subspace index to obtain a sampled compact index table.

FIG. 3 represents the concept of such spatial sampling. In the example of FIG. 3, the sampling factor 332 is four (N=4) such that only every fourth entry of a subspace 326 of the hash index 116 in this example has its compact signature entered (by an adaptive sampling mechanism 334 of the hash index service 116) into a sampled compact index table 322. As can be seen, each compact signature of a hash value (CS(HV)) is associated with a pointer to that subspace's entry, however only one of every four subspace hashes has a compact signature in the sampled compact index table 322.

The hash index service 116 may choose to use a different sampling factor for any situation, such as based on the access activity of each subspace and that subspace's anticipated deduplication saving. For example, for a subspace that has exhibited recent hash value hits, or a subspace that exhibits significant deduplication matching, a compact index table with a lower sampling factor (as low as one) may be used. In contrast, for a subspace that is inactive, or has rarely exhibited much deduplication matching in the past, a compact index table with a higher sampling factor may be used.

Note however that the block of hashes obtained for the look-ahead cache are not sampled, that is, the look ahead cache still receives all hash entries after a hash hit up to some number (or an end of file boundary/marker 338 saved in the hash index for each set of a file's hashes). For example, if the compact signature of hash value HV5, CS(HV)5, is found during a compact table lookup, and the pointer followed to hash value HV5 in the hash index where a match is found, not only is the chunk metadata CM5 returned, but the hash values HV6-HV12 (up to the end of file marker 338) are returned and loaded into the look-ahead cache 124, even though most do not have representative compact signatures in the compact signature table (only HV9 does) because of sampling. Note that it is feasible to also cache HV1 to HV5 entries in the look-ahead cache, or entries beyond HV12 (which may be useful in a backup scenario if deduplicated files are being processed in the same order as they were first deduplicated, for example).

Another type of sampling may be performed based on the hash index entries' data, e.g., the hash values (or possibly the chunk metadata). That is, instead of spatial sampling based on the hash values' positions in the subspace, the value of the hash determines whether a compact signature is generated or not. As a simplified example, a sampling factor of approximately two may be obtained by selecting only odd hash values (or odd chunk metadata references) that is, with a least significant bit equal to one. A combination of sampling techniques may be used.

Figure 4:
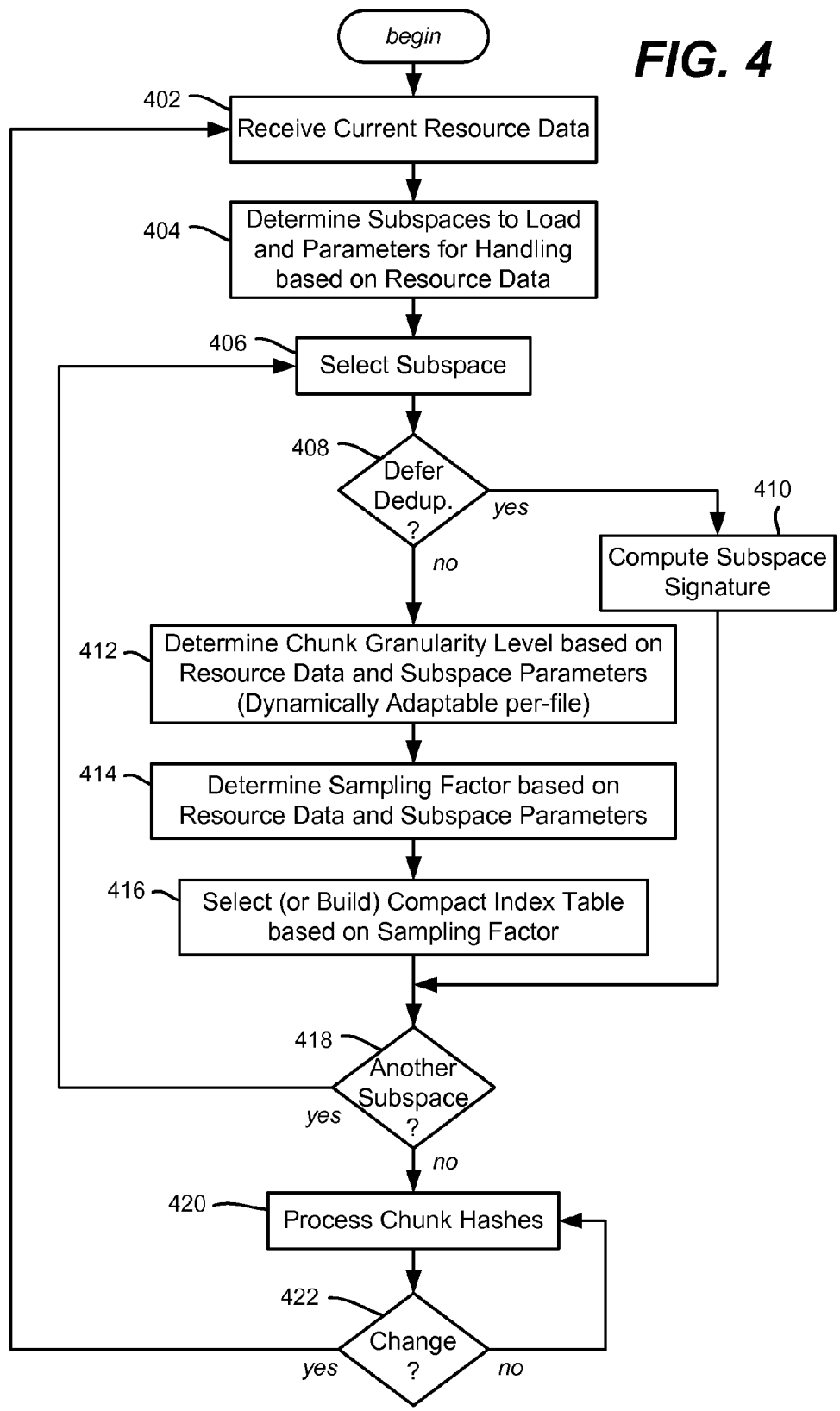
FIG. 4 is a flow diagram representing example steps for adapting indexes and indexing techniques based on current resource availability.

FIG. 4 summarizes example steps that may be taken in performing adaptive indexing according to the above-described concepts. Note that FIG. 4 generally refers to a hash index configured as a plurality of subspaces, however some of the steps of FIG. 4 (such as those related to sampling for the compact index table) are applicable to a single hash index.

Step 402 of FIG. 4 represents receiving the current resource data, e.g., the amount of memory that is available for indexing. Step 404 represents determining which subspaces are to be loaded, and any parameters for handling those subspaces (e.g., how much memory is available for each subspace index, how much has that subspace recently been hit, and so on), based upon the current resource data. As described above, the hash store in the secondary device can be selectively enabled for some subspaces and disabled for others, e.g., to not perform chunking for a subspace with encrypted content.

The subspaces may then be loaded/initialized and so forth on a per-subspace basis, such as by selecting each one (step 406) and individually adapting the indexing for that selected subspace.

Step 408 represents a determination as to whether to defer processing for this subspace. As described above, not all subspaces need to be used in deduplication, that is, the system may choose not to apply detailed chunking and hash indexing when a subspace is first established. Instead, a signature may be computed for a subspace (step 410) and later used to determine how to handle deduplication of that subspace, e.g., through the match of its signature with other signature in another subspace, or when incoming content is identified as matching the signature of the subspace.

Step 412 represents determining a chunking granularity level for the subspace indexing. As described above, this may be dynamically adaptable on a per-file basis, as the data for the parent and children chunks are available.

Step 414 represent determining the sampling factor to use for building (or selecting for loading if already built) the sampled compact index table at step 416. Note that the factor may be one, in which case all of the hash entries for this subspace will have a compact signature in the compact index table. Further note that the various sampled compact index tables for the subspaces may be appended into a single compact index table for use during lookup operations.

Step 418 repeats the process for the other subsets (which may be done in parallel for two or more subsets). When finished, the hash index service is ready to process the chunk hashes at step 420.

The chunk hashes are then processed using the indexes and techniques set up for the subspaces, and processing continues during the deduplication operation. However, something in the system may change, which results in a needed reconfiguration. For example, the amount of available memory may change from plentiful to scarce, or vice-versa, and the indexes and related techniques may be adapted when this occurs. Step 422 represents detecting such a change that requires a reconfiguration of the above described operations.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 5:
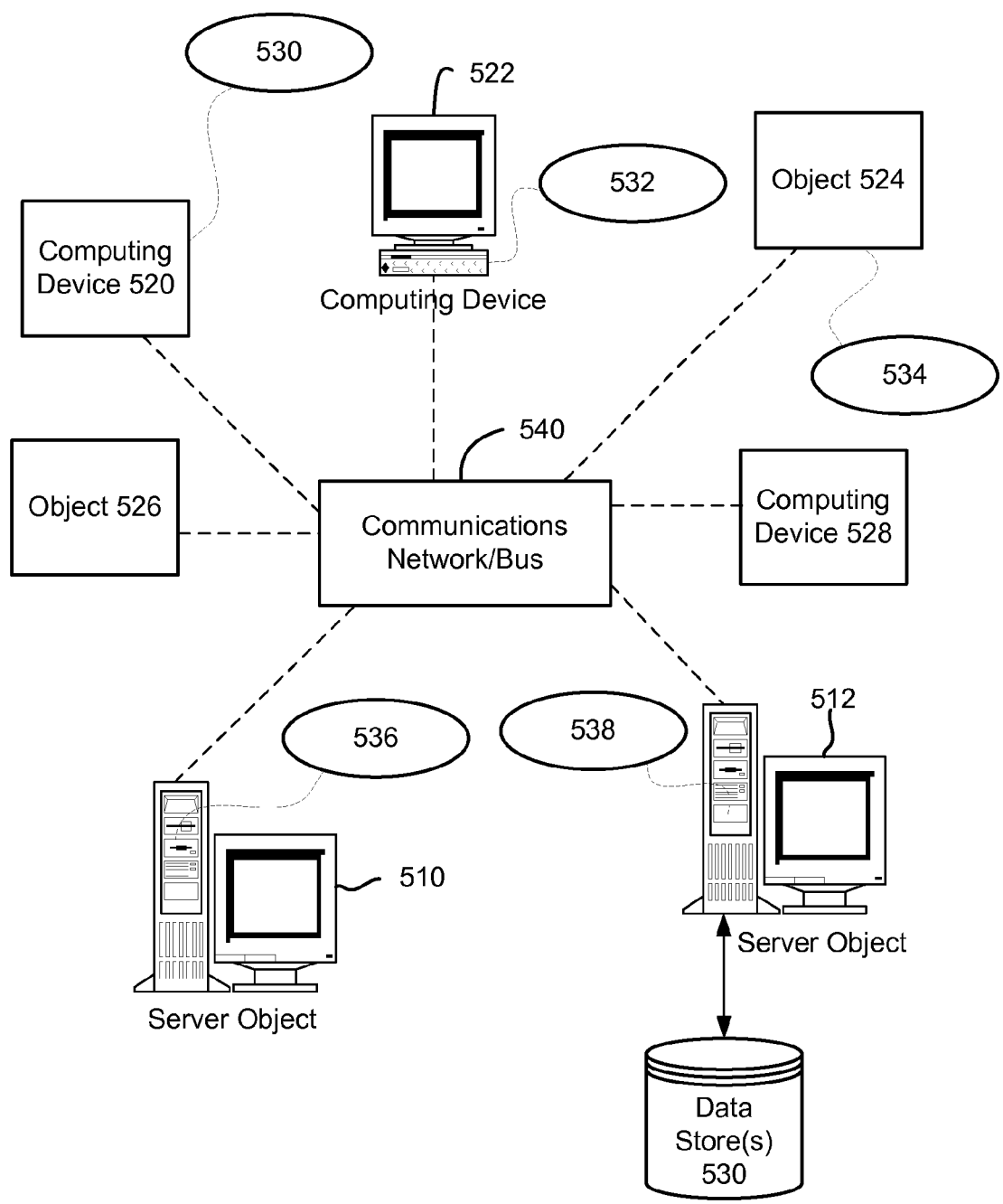
FIG. 5 is a block diagram representing exemplary non-limiting networked environments in which various embodiments described herein can be implemented.

FIG. 5 provides a schematic diagram of an exemplary networked or distributed computing environment. The distributed computing environment comprises computing objects 510, 512, etc., and computing objects or devices 520, 522, 524, 526, 528, etc., which may include programs, methods, data stores, programmable logic, etc. as represented by example applications 530, 532, 534, 536, 538. It can be appreciated that computing objects 510, 512, etc. and computing objects or devices 520, 522, 524, 526, 528, etc. may comprise different devices, such as personal digital assistants (PDAs), audio/video devices, mobile phones, MP3 players, personal computers, laptops, etc.

Each computing object 510, 512, etc. and computing objects or devices 520, 522, 524, 526, 528, etc. can communicate with one or more other computing objects 510, 512, etc. and computing objects or devices 520, 522, 524, 526, 528, etc. by way of the communications network 540, either directly or indirectly. Even though illustrated as a single element in FIG. 5, communications network 540 may comprise other computing objects and computing devices that provide services to the system of FIG. 5, and/or may represent multiple interconnected networks, which are not shown. Each computing object 510, 512, etc. or computing object or device 520, 522, 524, 526, 528, etc. can also contain an application, such as applications 530, 532, 534, 536, 538, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 5, as a non-limiting example, computing objects or devices 520, 522, 524, 526, 528, etc. can be thought of as clients and computing objects 510, 512, etc. can be thought of as servers where computing objects 510, 512, etc., acting as servers provide data services, such as receiving data from client computing objects or devices 520, 522, 524, 526, 528, etc., storing of data, processing of data, transmitting data to client computing objects or devices 520, 522, 524, 526, 528, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 540 or bus is the Internet, for example, the computing objects 510, 512, etc. can be Web servers with which other computing objects or devices 520, 522, 524, 526, 528, etc. communicate via any of a number of known protocols, such as the hypertext transfer protocol (HTTP). Computing objects 510, 512, etc. acting as servers may also serve as clients, e.g., computing objects or devices 520, 522, 524, 526, 528, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 6 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 6:
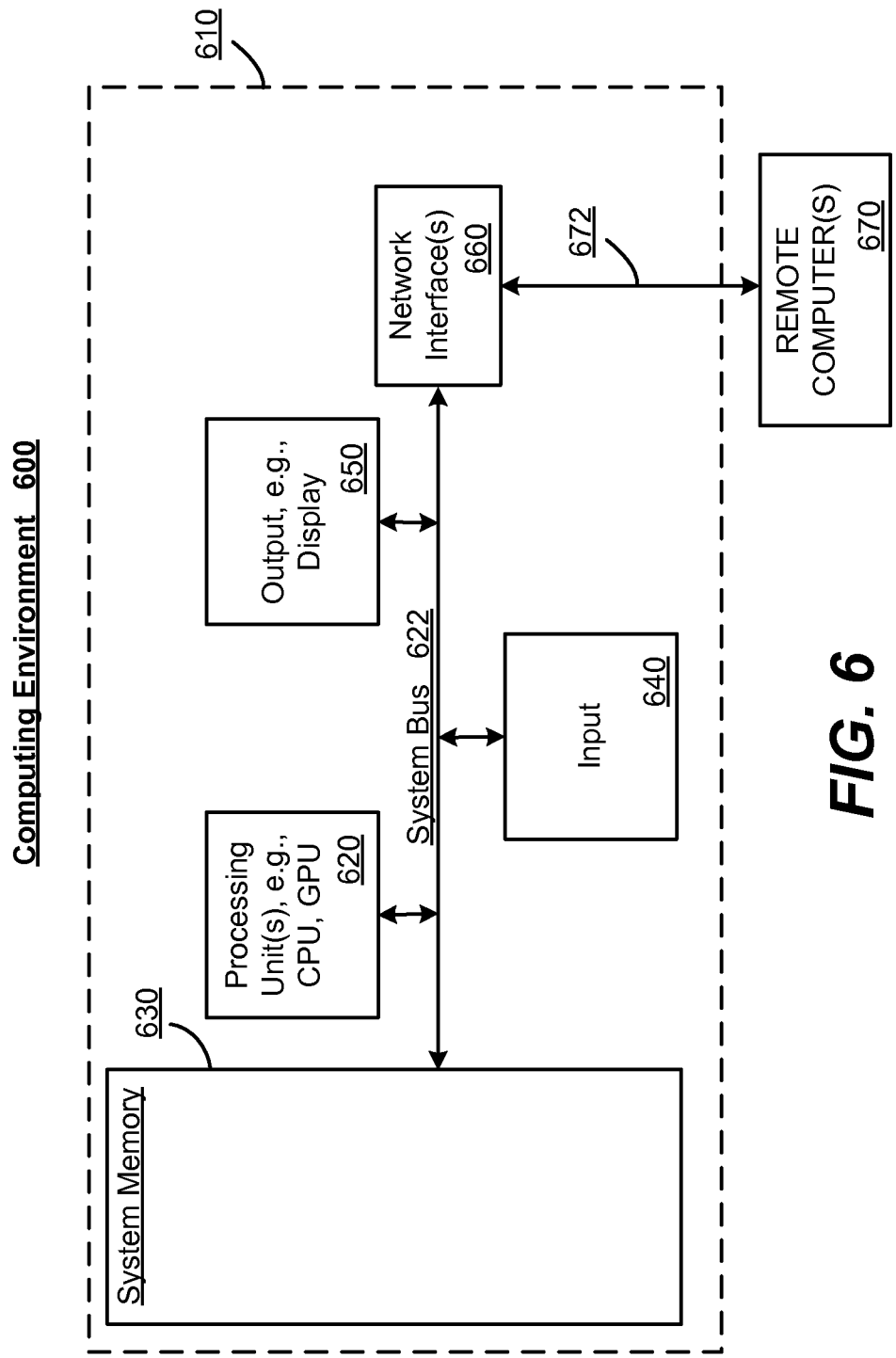
FIG. 6 is a block diagram representing an exemplary non-limiting computing system or operating environment in which one or more aspects of various embodiments described herein can be implemented.

FIG. 6 thus illustrates an example of a suitable computing system environment 600 in which one or aspects of the embodiments described herein can be implemented, although as made clear above, the computing system environment 600 is only one example of a suitable computing environment and is not intended to suggest any limitation as to scope of use or functionality. In addition, the computing system environment 600 is not intended to be interpreted as having any dependency relating to any one or combination of components illustrated in the exemplary computing system environment 600.

With reference to FIG. 6, an exemplary remote device for implementing one or more embodiments includes a general purpose computing device in the form of a computer 610. Components of computer 610 may include, but are not limited to, a processing unit 620, a system memory 630, and a system bus 622 that couples various system components including the system memory to the processing unit 620.

Computer 610 typically includes a variety of computer readable media and can be any available media that can be accessed by computer 610. The system memory 630 may include computer storage media in the form of volatile and/or nonvolatile memory such as read only memory (ROM) and/or random access memory (RAM). By way of example, and not limitation, system memory 630 may also include an operating system, application programs, other program modules, and program data.

A user can enter commands and information into the computer 610 through input devices 640. A monitor or other type of display device is also connected to the system bus 622 via an interface, such as output interface 650. In addition to a monitor, computers can also include other peripheral output devices such as speakers and a printer, which may be connected through output interface 650.

The computer 610 may operate in a networked or distributed environment using logical connections to one or more other remote computers, such as remote computer 670. The remote computer 670 may be a personal computer, a server, a router, a network PC, a peer device or other common network node, or any other remote media consumption or transmission device, and may include any or all of the elements described above relative to the computer 610. The logical connections depicted in FIG. 6 include a network 672, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising:
    processing a subspace-divided hash index of which at least one subspace index comprises a subset of the hash index and corresponds to a different level of granularity for use in indexing data than another subspace index;
    selecting a level of granularity to use in indexing one or more chunks of a file based upon at least one of a file type, a file usage pattern, or a user type;
    for each of at least one chunk hash at the selected granularity level, using a subspace index having the selected level of granularity to determine whether that chunk hash is already indexed or is a non-indexed chunk hash;
    selecting another level of granularity to use in indexing one or more other chunks of the file based upon resource utilization and deduplication saving; and
    for each of at least one chunk hash at the other selected granularity level, using a subspace index having the other selected level of granularity to determine whether that chunk hash is already indexed or is a non-indexed chunk hash.

2. The method of claim 1 further comprising selecting a level of granularity for a particular subspace of the subspace-divided hash index based upon at least one of a file type, a file usage pattern, or a user type.

3. The method of claim 1 further comprising, re-indexing the chunks at a different level of granularity.

4. The method of claim 3 wherein re-indexing the chunks comprises running an offline process after running an online deduplication process.

5. The method of claim 1 further comprising, detecting a change to one or more resources, and selecting a different level of granularity based upon the change.

6. The method of claim 1 further comprising, increasing the level of granularity after a miss is detected after a plurality of hash hits, and decreasing the level of granularity after a plurality of hash hits.

7. The method of claim 1 further comprising, maintaining a hash index in a secondary storage device, in which entries of the hash index comprise hash values and associated metadata with each hash value, maintaining a sampled compact index table in a primary storage device that includes compact signatures representative of some of the hash values of the hash index, and for each compact signature, a pointer to a corresponding hash value, metadata entry in the hash index, wherein the sampled compact index table contains less entries than the hash index based upon a sampling factor; and accessing the sampled compact index table determining whether that chunk hash is already indexed or is a non-indexed chunk hash.

8. In a computing environment, a system, comprising, at least one processor, and a memory communicatively coupled to the at least one processor and including components comprising:
   a hash index maintained in a secondary storage device comprising a plurality of subspace indices, in which entries of the hash index comprise hash values and associated metadata with each hash value, and each subspace index of the hash index comprises a subset of the hash index;
   a sampled compact index table in a primary storage device that includes compact signatures representative of some of the hash values of the hash index, and each compact signature corresponds to a hash value in the hash index and is associated with a pointer to the corresponding hash value and metadata entry in the hash index, wherein the sampled compact index table contains fewer entries than the hash index based upon a sampling factor; and
   a hash index service executed by the at least one processor and configured to access the sampled compact index table, when attempting to determine whether a given hash value is indexed in the hash index, to compare a compact signature representing a plurality of hash values associated with a subspace index to a compact signature calculated from incoming data chunks to determine whether the subspace index is to be used for a deduplication process on the incoming data chunks and perform the deduplication process using the subspace index in response to determining that a resemblance metric returned from the comparison of the two compact signatures is greater than a threshold value.

9. The system of claim 8 wherein the sampled compact index table is built from entries of a subspace comprising a smaller subset of the hash index.

10. The system of claim 8 wherein the sampled compact index table is built by a sampling mechanism that selects sample entries based upon spatial positions in the hash index that correspond to the sample factor.

11. The system of claim 8 wherein the sampled compact index table is built by a sampling mechanism that selects sample entries based upon entries' values in the hash index that correspond to the sample factor.

12. The system of claim 8 further comprising a look-ahead cache in the primary storage device that includes hash values and metadata entries cached from the index table, wherein the hash index service is further configured to access the look-ahead cache to lookup a hash value and return the metadata associated with that hash value if found in the look-ahead cache, so as to not need to access the hash index when attempting to determine whether a given hash value is indexed in the hash index if found in the look-ahead cache.

13. The system of claim 12 wherein the hash index service accesses the sampled compact index table to determine a location of a hash value in the hash index, the hash index service further configured to use the location to determine that the given hash value matches a full hash value of the location in the hash index; and to determine if a given hash value is indexed in the hash index, to obtain one or more neighbor hash index, metadata entries when accessing the hash index, and to add the one or more neighbor hash index, metadata entries to the look-ahead cache.

14. The system of claim 13 wherein the hash index service is further configured to obtain the one or more neighbor hash index, metadata entries up to a file boundary that corresponds to a deduplicated file.

15. The system of claim 8 wherein the hash index service is further configured to detecting a change to one or more resources, and to rebuild or reselect a different sampled compact index table corresponding to a different sample factor based on the change to the one or more resources.

16. The system of claim 8 wherein the hash index service is further configured to select the sampled compact index table based on a selected level of granularity.

17. An article of manufacture comprising storage hardware having computer-executable instructions, which when executed perform steps, comprising:
   selecting a hierarchical index having at least three levels of granularity;
   chunking a portion of a file into one or more chunks using the hierarchical index;
   detecting a change in availability of one or more resources for a deduplication process on the one or more chunks at a level of granularity; and
   adjusting the level of granularity used for a deduplication process to a different granularity level of the at least three levels of granularity based on the change in availability of the one or more resources.

18. The article of claim 17 further comprising selecting another hierarchical index based upon the change in the availability of the one or more resources.

19. The article of claim 17 further comprising computing a signature, representative of a plurality of hash values associated with a subspace of the hash index, based upon at least some of the data corresponding to that subspace; comparing the signature to a signature for incoming data chunks to determine whether the subspace index is to be used for the deduplication process on the incoming data.

20. The article of claim 19 having further computer-executable instructions comprising, re-determining from the signature whether the subspace index corresponding to the subspace is to be used during a deduplication process in view of the change to the one or more resources and if so, using the hierarchal index to adjust to a different granularity level of the at least three levels of granularity during the deduplication process.

* * * * *